United States Patent
Kang

(10) Patent No.: US 10,126,955 B2
(45) Date of Patent: Nov. 13, 2018

(54) METHOD AND APPARATUS FOR BIG SIZE FILE BLOCKING FOR DISTRIBUTED PROCESSING

(71) Applicant: SAMSUNG SDS CO., LTD., Seoul (KR)

(72) Inventor: Seong-Moon Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 368 days.

(21) Appl. No.: 15/095,267

(22) Filed: Apr. 11, 2016

(65) Prior Publication Data
US 2017/0115895 A1   Apr. 27, 2017

(30) Foreign Application Priority Data
Oct. 27, 2015  (KR) .................. 10-2015-0149158

(51) Int. Cl.
| G06F 13/00 | (2006.01) |
|---|---|
| G06F 3/06 | (2006.01) |
| G06F 17/30 | (2006.01) |
| H04L 29/08 | (2006.01) |

(52) U.S. Cl.
CPC ............ *G06F 3/0613* (2013.01); *G06F 3/067* (2013.01); *G06F 3/0644* (2013.01); *G06F 3/0659* (2013.01); *G06F 17/30091* (2013.01); *G06F 17/30138* (2013.01); *G06F 17/30194* (2013.01); *H04L 67/1008* (2013.01); *H04L 67/1031* (2013.01); *H04L 67/1097* (2013.01)

(58) Field of Classification Search
CPC .. G06F 3/0613; G06F 17/30138; G06F 3/067; G06F 3/0659; G06F 3/0644; G06F 17/30091; G06F 17/30194; H04L 67/1031; H04L 67/1008; H04L 67/1097
USPC .................................. 709/201; 718/104, 105
See application file for complete search history.

(56) References Cited

U.S. PATENT DOCUMENTS

| 7,487,138 | B2 * | 2/2009 | Borthakur ......... G06F 17/30067 |
|---|---|---|---|
| 7,992,037 | B2 * | 8/2011 | Dubnicki ................ G06F 11/14 |
| | | | 714/6.2 |
| 9,449,014 | B2 * | 9/2016 | Bashyam .......... G06F 17/30174 |
| 2006/0059171 | A1 * | 3/2006 | Borthakur ......... G06F 17/30067 |
| 2006/0117071 | A1 | 6/2006 | Sobko |
| 2010/0064166 | A1 * | 3/2010 | Dubnicki ................ G06F 11/14 |
| | | | 714/4.1 |
| 2012/0078844 | A1 | 3/2012 | Kim |
| 2012/0278587 | A1 | 11/2012 | Caufield et al. |
| 2013/0117273 | A1 | 5/2013 | Lee et al. |

(Continued)

FOREIGN PATENT DOCUMENTS

| KR | 10-2012-0032920 A | 4/2012 |
|---|---|---|
| WO | 2011/128257 A1 | 10/2011 |

OTHER PUBLICATIONS

International Search Report for PCT/KR2015/014136 dated Jul. 25, 2016 [PCT/ISA/210].

*Primary Examiner* — Kenneth R Coulter
(74) *Attorney, Agent, or Firm* — Sughrue Mion, PLLC

(57) ABSTRACT

A method for big size file blocking for distributed processing by a plurality of work nodes that belong to a distributed processing system, the method comprising, dividing the file into a first area and a second area processed later than data of the first area, partitioning the first area into blocks having various sizes and partitioning the second area into blocks having a fixed size.

17 Claims, 9 Drawing Sheets

(56) References Cited

U.S. PATENT DOCUMENTS

| | | | |
|---|---|---|---|
| 2013/0138607 A1* | 5/2013 | Bashyam | G06F 17/30174 707/610 |
| 2014/0258672 A1* | 9/2014 | Herron | G06F 12/0223 711/171 |
| 2014/0359126 A1 | 12/2014 | Breternitz et al. | |

* cited by examiner

RELATED ART

METHOD AND APPARATUS FOR BIG SIZE FILE BLOCKING FOR DISTRIBUTED PROCESSING

This application claims priority from Korean Patent Application No. 10-2015-0149158 filed on Oct. 27, 2015 in the Korean Intellectual Property Office, the disclosure of which is incorporated herein by reference in its entirety.

BACKGROUND

1. Field of the Invention

The present invention relates to a method and an apparatus for big size file blocking for distributed processing. More particularly, the present invention relates to a method and an apparatus for big size file blocking so that working nodes that distributes and process blocked big size files can substantially simultaneously complete processing the big size files.

2. Description of the Related Art

Provided is a technology that distributively processes big size data. Further, provide is a technology that distributively stores a file including the bit size data through different computing devices.

For example, in a Hadoop distributed file system (HDFS) which is a distributed file processing system of Hadoop which is a widely known big size data processing platform, the big size data is divided in a block wise to be distributively stored in a clustered data node. Further, meta information of each block, which is distributively stored is stored in a name node. The meta information may include, for example, storage position information of each block. When the block is formed with a fixed size, as a data size increases, the number of blocks increases, and as a result, the size of the meta information will increase. Table 1 given below an increase in size of the meta information accompanied by distributive storage of files is shown according to a file size.

TABLE 1

| File size | The number of blocks (64 MB per block) | Meta information size (wise, MB) (150K bytes per block) |
|---|---|---|
| 1 GB | 16 | 0.00 |
| 10 GB | 160 | 0.02 |
| 100 GB | 1,600 | 0.23 |
| 1 TB | 16,384 | 2.34 |
| 10 TB | 163,840 | 23.44 |
| 100 TB | 1,638,400 | 234.38 |
| 1 PB | 16,777,216 | 2,400.00 |

As shown in Table 1 given above, it may be known that for example, a file having a 1 PB size is divided 16,777,216 blocks to be stored, and as a result, only the meta information size reaches 2,400 MB (2.34 GB). Since the meta information needs to be frequently accessed, the meta information needs to be loaded onto a memory. Operating data which reaches approximately 2.34 GB while loading the corresponding data onto the memory is significantly burdensome. In addition to a burden in operating the meta information depending on the distributive storage, even a burden in creation and operation of each block processing task depending on the distributive processing will be generated. The reason is that a task processing history needs to be managed.

Even so, the block size cannot be thoughtlessly increased. The reason is that an effect of work distribution depending on the distributive processing deteriorates.

Therefore, providing an efficient file blocking method which can suppress a level to increase the number of blocks as the file size increases and a distributive processing management method of a big size file using the method is requested. In the specification, blocking indicates dividing the file in a block wise.

SUMMARY

An aspect of the present invention provides an efficient file blocking method which can suppress a level to increase the number of blocks as a file size increases even while maintaining an effect of work distribution and an apparatus thereof.

Another aspect of the present invention provides a method for managing distributed processing which allows each work node to maximally simultaneously complete processing of an allocated block even while distributively processing big size data divided into a smaller number of blocks and an apparatus thereof.

Still another aspect of the present invention provides a method for managing distributed processing which allows each work node to maximally simultaneously complete processing of an allocated block by automatically reflecting a working environment of a distributed processing system during blocking a big size file for distributed processing and an apparatus thereof.

In some embodiments, a method for big size file blocking for distributed processing by a plurality of work nodes that belong to a distributed processing system, the method comprising, dividing the file into a first area and a second area processed later than data of the first area, partitioning the first area into blocks having various sizes and partitioning the second area into blocks having a fixed size.

In some embodiments, a distributed processing method of a big size file, comprising, providing a file having a first area partitioned into blocks having various sizes and a second area processed later than data of the first area and partitioned into blocks having a fixed size, evenly dividing and allocating blocks of the first area and blocks of the second area to a plurality of work nodes that belong to a distributed processing system and performing a load re-balancing work according to an unprocessed block situation of each work node by monitoring processing situations for the blocks of the work nodes.

In some embodiments, a distributed processing management apparatus of a big size file, comprising, one or more processors, a memory to which a computer program executed by the processor is loaded and a network interface connected to a plurality of work nodes that belong to a distributed processing system, wherein the computer program comprises, an operation of dividing a file distributively processed by the plurality of work nodes into a first area and a second area processed later than data of the first area, an operation of partitioning of the first area into blocks having various sizes, an operation of partitioning the second area into blocks having a fixed size and an operation of evenly dividing and transmitting the blocks of the first area and the blocks of the second area to the plurality of work nodes through the network interface.

In some embodiments, a computer program stored in a recording medium, which used for executing, comprising, in association with a computing device, dividing a file distributively processed by a plurality of work nodes that belong to a distributed processing system into a first area and a second area processed later than data of the first area, partitioning the first area into blocks having various sizes and partitioning the second area into blocks having a fixed size.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Distributed Processing System of Big Size File

Hereinafter, referring to FIG. 1, a configuration and an operation of a distributed processing system of a big size file according to an embodiment of the present invention will be described. The distributed processing system according to the embodiment of the present invention may include a distributed processing management apparatus 100 and a work node cluster 200 constituted by a plurality of work nodes 202.

The distributed processing management apparatus 100 blocks the big size file provided from a big size file from a big size file creating system 300 to allocate respective blocks formed by a result of the blocking to the respective work nodes 202. The respective work nodes 202 perform predefined processing logic with respect to the allocated blocks. The big size file creating system 300 designates a system having a various functions, which collects big size data to create the big size file. For example, the big size file creating system 300 may be a system that aggregates dealing details of a credit card, a system that aggregates activity details of a user on a social network system, a system that collects positional information of each terminal device, and the like.

Figure 1:
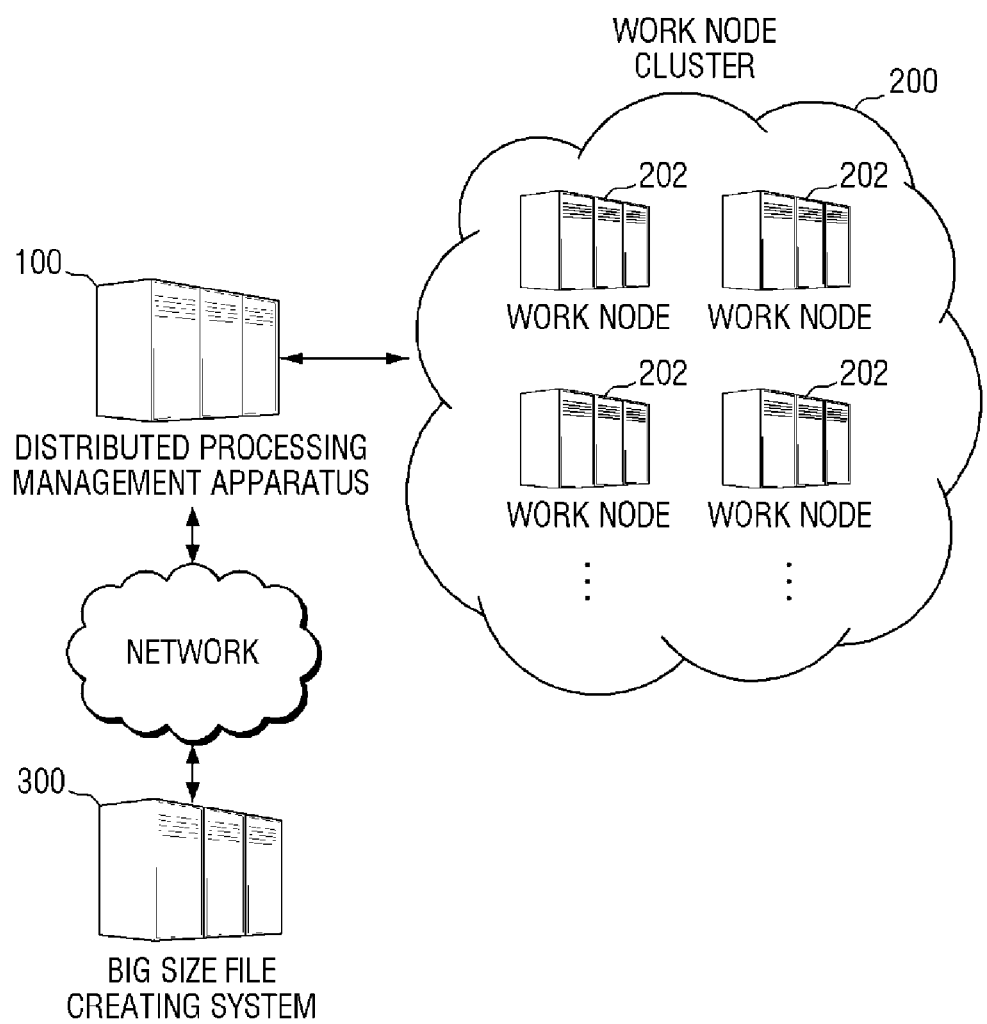
FIG. 1 is a layout view of a distributed processing system according to an embodiment of the present invention.

In FIG. 1, it is illustrated that the distributed processing management apparatus 100 and the big size file creating system 300 are physically separated from each other, but in some embodiments, the distributed processing management apparatus 100 may be configured as one module in the big size file creating system 300.

As already mentioned, the distributed processing management apparatus 100 bocks the big size file. The big size file may be divided into a first area and a second area. The second area is an area processed later than data of the first area when being processed by the respective work nodes 202. The distributed processing management apparatus 100 blocks the first area and the second area in different schemes. The distributed processing management apparatus 100 partitions the first area into blocks having various sizes. The distributed processing management apparatus 100 partitions the first area into blocks having various sizes.

Most blocks in the first area have larger block sizes than the blocks having the fixed size. Therefore, the distributed processing management apparatus 100 forms a smaller number of blocks than blocking the whole big size file into the blocks having the fixed size.

Further, the second area which is the area processed later is divided into the blocks having the fixed size and the fixed size is determined a fixed system set-up or a user set-up. The fixed size is set in a range not to exceed a predetermined data size so as to become a wide of load re-balancing such as 64 MEGA BYTE (MB) or 12 MB.

In other words, the distributed processing management apparatus 100 blocks blocks in a first half part of the big size file of which the load re-balancing is not required into blocks having a large size and blocks in a second half part of the big size file of which the load re-balancing my be required into blocks a small fixed size, respectively. A new blocking method presented in the present invention may bring the same effect of the work distribution with a smaller number of blocks than the fixed-size blocking in the related art. The blocking method performed by the distributed processing management apparatus 100 will be described in more detail through some embodiments.

The distributed processing management apparatus 100 may block the big size file according to an HDFS. In this case, the respective blocks may be distributed and stored in the work nodes 202 and meta information regarding the position of each block, and the like may be stored in the distributed processing management apparatus 100. That is, in this case, it may be appreciated that the work node is a data node of the HDFS and the distributed processing management apparatus 100 is a name node of the HDFS.

The distributed processing management apparatus 100 may additionally perform a role of a task scheduler. That is, the distributed processing management apparatus 100 provides the blocks to be processed and stored to the respective work nodes 202 to allocate the task and monitors a situation in which processing logic is performed with respect to the blocks allocated to the respective work nodes 202 to perform the load re-balancing work according to a processing progress situation of each work node 202.

In some embodiments of the present invention, the load re-balancing work aims at completion of processing blocks which the respective work nodes 202 are allocated with substantially at the same time. Substantially completing the processing substantially at the same time means that a gap between processing completion estimated times does not exceed a predetermined time. Therefore, the load re-balancing work includes a work of reallocating blocks allocated to a work node 202 having a lot of unprocessed blocks to a work node 202 having a small number of unprocessed blocks. Even a load re-balancing method performed by the distributed processing management apparatus 100 will be described in more detail through some embodiments.

Blocking of Big Size File

Hereinafter, referring to FIG. 2, a method for big size file blocking according to another embodiment of the present invention will be described. The method for big size file blocking according to the embodiment may be performed by a computing device. For example, the method for big size file blocking according to the embodiment may be performed by the distributed processing management apparatus 100 illustrated in FIG. 1. Hereinafter, in a description associated with FIG. 2, it is noted that a main agent of an operation may be omitted for helping convenience of appreciation.

Figure 2:
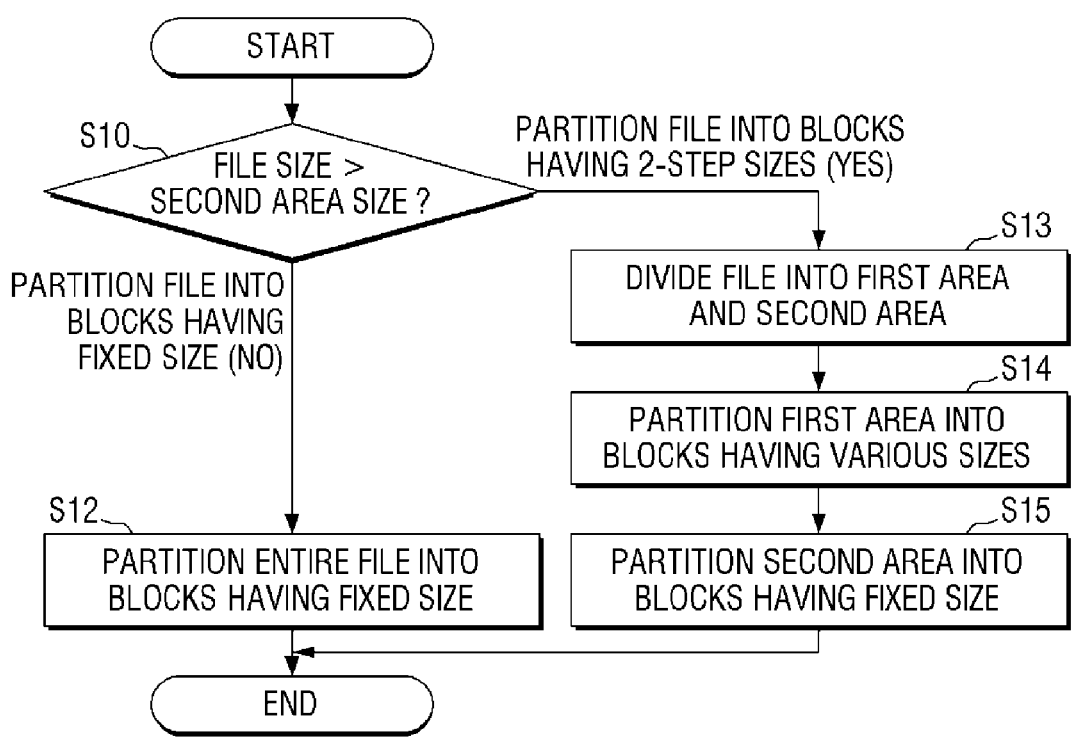
FIG. 2 is a flowchart of a method for big size file blocking according to another embodiment of the present invention.

As illustrated in FIG. 2, only when a size of a file to be blocked is larger than that of the second area, blocking of different schemes is applied to the first and second areas (S14 and S15). That is, in FIG. 2, it is illustrated that the size of the file to be blocked is equal to or smaller than that of the second area, blocking is performed with blocks having a predetermined fixed size with respect to the entire file. The blocking method of the present invention is not limited to the method illustrated in FIG. 2. In the present invention, it is noted that even the embodiment is included, in which the blocking in different schemes is continuously applied to the first and second areas regardless of the size of the file to be blocked unlike FIG. 2.

When the embodiment illustrated in FIG. 2 is described again, first, it is determined whether the size of the file to be partitioned is larger than that of the second area (S10). The second area is an area processed later in the file as already mentioned. The second area needs to have an appropriate size in order to achieve an effect of load distribution. A method for acquiring the size of the second area will be described with reference to FIG. 3.

As already mentioned, a block (hereinafter, referred to as 'base block') having a fixed size is formed in the second area. It is assumed that the size of the base block is 64 MB. The base block formed in the second area will be evenly divided and allocated to the respective work nodes 202. For example, 100 base blocks are formed in the second area and when the number of work nodes is 20, each work node 202 will be allocated with 5 (100/20) base blocks.

Each work node 202 may have an environment in which a plurality of parallel processes are executed. The parallel processes may be simultaneously executed in parallel by the respective work nodes 202 by using multi-tasking technology. Each parallel process needs to be allocated with at least one base block. Therefore, in an embodiment, the size of the second area may be calculated by using a value acquired by multiplying the number of parallel processes for data distributed processing by the number of work nodes.

The base block serves as a kind of buffer in that the base block may be used as a target to the load re-balancing. Therefore, as each work node 202 has more base blocks, a possibility that times when block processing of the respective work nodes ends may be adjusted to be the same as each other increases. The number of base blocks allocated to the respective parallel processes of each work node 202 is designated as a work distribution effect parameter. It may be appreciated that the work distribution effect parameter is a natural number of 1 or more, which is set to a larger value as the need for the work nodes to simultaneously complete the file processing increases. In this case, the size of the second area is automatically calculated by a value acquired by multiplying the fixed size, the umber of work nodes which belong to the distributed processing system, the number of parallel processes for the data distributed processing, and the work distribution effect parameter by each other.

A manager of the distributed processing system may set to the work distribution effect parameter to a high value as the need for the work nodes to simultaneously complete the file processing increases. However, since the number of blocks also increases as the work distribution effect parameter is larger, thoughtlessly setting the work distribution effect parameter needs to be avoided. Hereinafter, an embodiment in which the distributed processing system automatically sets the work distribution effect parameter according to a computing environment of the distributed processing system will be described.

The work distribution effect parameter may be automatically set by reflecting a difference in performance among the respective work nodes 202. Data regarding the difference in performance among the respective work nodes 202 may be, in advance, secured through a scheme that automatically collects a calculation speed test execution result periodically performed with respect to each work node 202 or performed while being triggered to occurrence of a specific event. The work distribution effect parameter may be set to a smaller value as the performances of the respective work nodes 202 are the same as each other and set to a larger value as the difference in performance among the respective work nodes 202 is larger.

The work distribution effect parameter may be automatically set by reflecting operation cost of each work node 202, which is previously input. The reason for performing the load re-balancing so that each work node 202 substantially simultaneously completes processing of each block is that some work nodes 202 stands by in an idle state until other work nodes 202 completes a work after first completing the work. Therefore, as the operation cost per time of each work node is larger, it is preferable to increase the work distribution effect parameter in order to minimize an occurrence probability of the idle state. On the contrary, as the operation cost per time of each work node 202 is smaller, since it may be still relatively profitable to decrease the number of partitioned blocks even though the occurrence of the idle state increases in some degree.

The work distribution effect parameter may be automatically set by using programming complexity of logic applied to files distributively processed through each work node. The programming complexity as one of software metrics indicates in what degree interaction among a plurality of entities in software exists. Logics applied to the respective blocks are the same as each other, but since input data are different from each other, as the programming complexity of the logic is higher, a possibility that calculation loads consumed for processing will be different from each other is higher. Therefore, as the programming complexity of the logic is higher, it is preferable to further increase a load re-balancing capability as compared with variation in block processing speed of each work node by increasing the work distribution effect parameter.

The programming complexity may indicate, for example, a Cyclomatic Complexity value (hereinafter, referred to as "Cyclomatic Complexity of McCabe") defined in 1976 by Thomas J. McCabe, Sr. The Cyclomatic Complexity of McCabe is a value indicating the number of independent execution paths of a program source code. A method for acquiring the Cyclomatic Complexity of McCabe may be described with reference to widely known literatures such as a first literature: McCabe (December 1976). "A Complexity Measure". IEEE Transactions on Software Engineering: 308-320, a second literature: Arthur H. Watson and Thomas J. McCabe (1996). "Structured Testing: A Testing Methodology Using the Cyclomatic Complexity Metric" (PDF): NIST Special Publication 500-235, and the like.

A widely known source code analyzer may be used, such as a third literature: A small C/C++ source code analyzer using the cyclometric complexity metric (https://sites.google.com/site/maltapplication/), or the like in order to acquire the Cyclomatic Complexity of McCabe for the logic.

For example, the work distribution effect parameter may be automatically set to a larger value as the difference in performance among the work nodes is larger, the operation cost per time of the work node is higher, and the Cyclomatic Complexity of McCabe of processing logic is higher.

Figure 3:
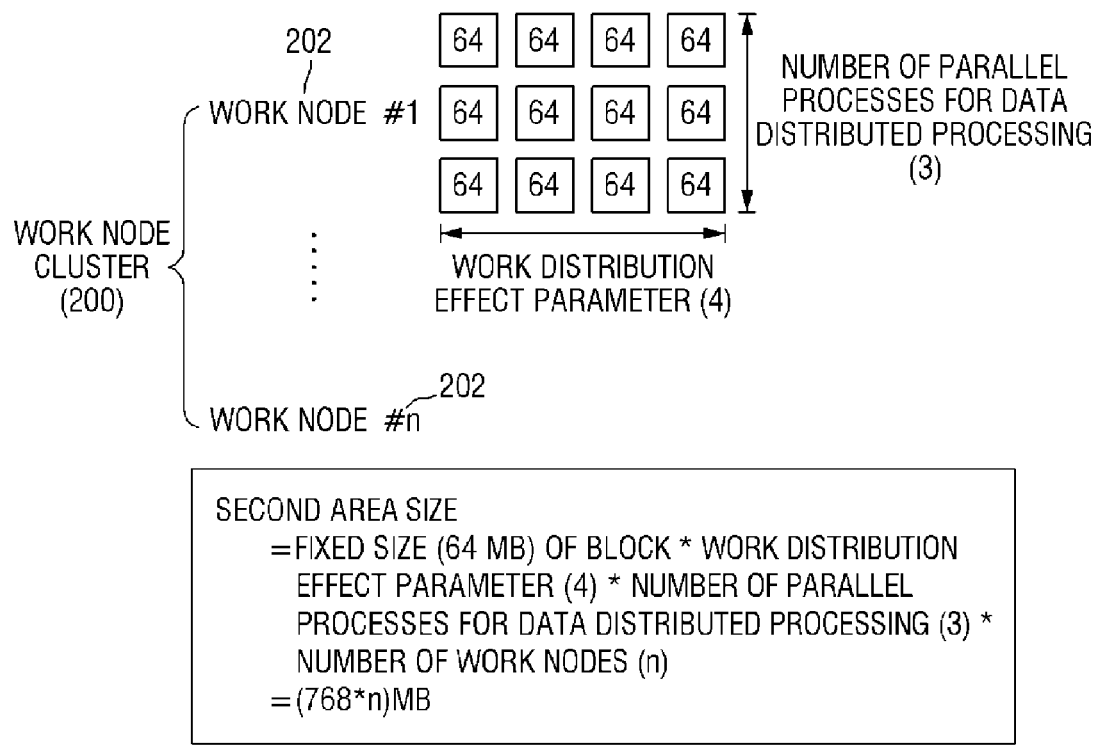
FIG. 3 is a conceptual diagram for describing a method for determining the size of a second area when dividing a large size file into first and second areas considered in some embodiments of the present invention.

In the case of a situation illustrated in FIG. 3, each work node 202 simultaneously executes three parallel processes and the work distribution effect parameter is set to 4. Further, the size of the base block is 64 MB. Therefore, when the number of work nodes is n, the size of the second area is automatically calculated as (768*n) MB. For example, when the number of work nodes is 100, the size of the second area becomes 76800 MB=75 GB.

Figure 4:
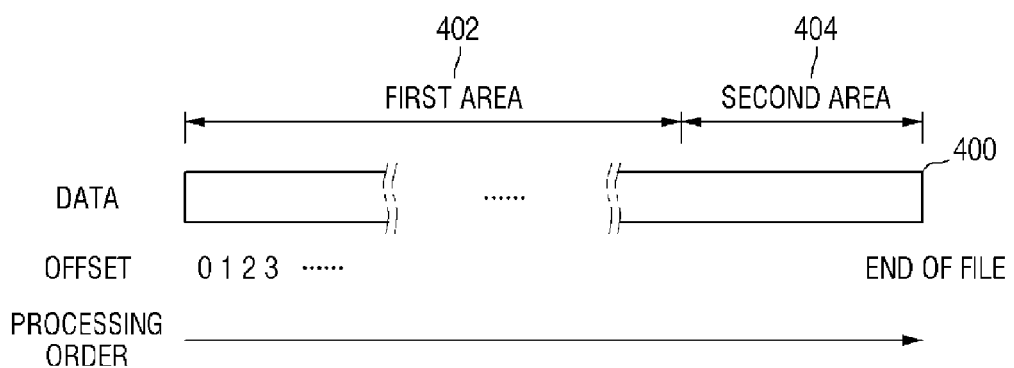
FIG. 4 is a conceptual diagram for describing the first and second areas of the big size file considered in some embodiments of the present invention.

Referring to FIG. 4, the size of a second area 404 is 75 GB and the second area is positioned in an area of 75 GB at a rear side of the file. In the specification, a file 400 is processed in the order of a front side to the rear side and a foremost side will be data of which an offset of the file is 0 and a rearmost side will be data of which the offset of the file is (FILE_SIZE−1). In a method for dividing the file, the file is divided into two consecutive areas based on a reference offset (file size−second area size) and a front area which is processed early is determined as a first area 402 and a rear area which is processed later is determined as the second area 404.

Referring back to FIG. 2, when the size of the file is larger than the second area size (refer to FIG. 3 for the method for acquiring the second area size), (S10), the first is divided into the first area and the second area (refer to FIG. 4 for the method for dividing the file) (S13) and the first area is partitioned into blocks having various sizes (S14).

Figure 5A:
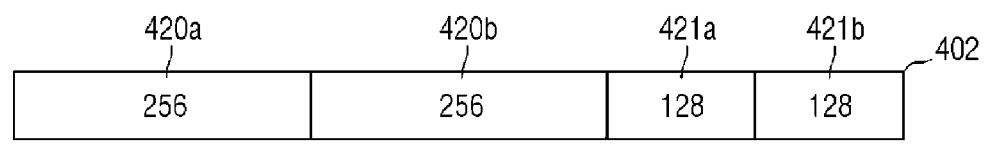
FIG. 5A illustrates an example of blocking the first area of the file according to the blocking method of the big size file of FIG. 2.

In an embodiment, the first area may include M blocks having each size (M represents the number of work nodes). This is for each work node to be allocated with each one block. FIG. 5A illustrates that when the number of work nodes is 2, two blocks 420a and 420b having a size of 256 MB and two blocks 421a and 421b having a size of 128 MB are formed in the first area.

Figure 5B:
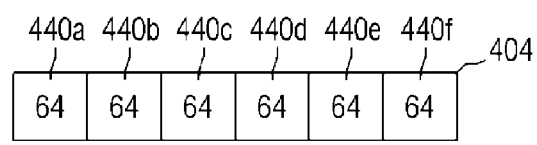
FIG. 5B illustrates an example of blocking the second area of the file according to the blocking method of the big size file of FIG. 2.

The second area is partitioned into the blocks having the fixed size, that is, the base blocks (S15). FIG. 5B illustrates that when the number of work nodes is set to 2, the number of parallel processes per work node is set to 1, and the work distribution effect parameter is set to 3, 6 (2*1*3) base blocks are formed in the second area.

Figure 6:
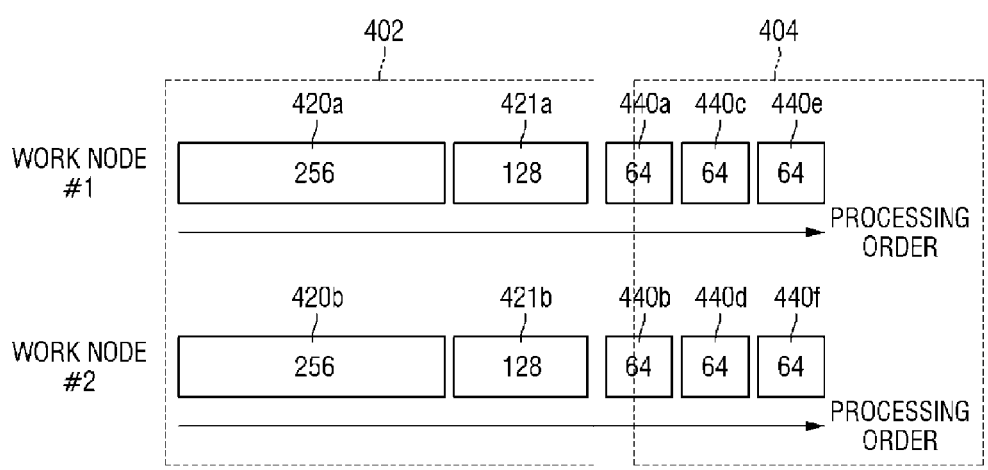
FIG. 6 is a conceptual diagram for describing a result in which respective blocks are allocated to a plurality of work nodes after the blocking illustrated in FIGS. 5A and 6B.

FIG. 6 illustrates how two respective work nodes are allocated with blocks when the file is blocked as illustrated in FIGS. 5A and 5B. Work node #1 processes the respective blocks in the order of the block 420a having 256 MB, the block 421a having 128 MB, and base blocks 440a, 440c, and 440e. Work node #2 processes the respective blocks in the order of the block 420b having 256 MB, the block 421b having 128 MB, and base blocks 440b, 440d, and 440f. It may be verified that the blocks 420a, 420b, 421a, and 421b having various sizes of the first area 402 are evenly allocated to the work node #1 and the work node #2. Further, it may be verified that 3 blocks of 6 base blocks 440a, 440b, 440c, 440d, 440e, and 440f of the second area 404 are also evenly allocated to each of the work node #1 and the work node #2.

Figure 7:
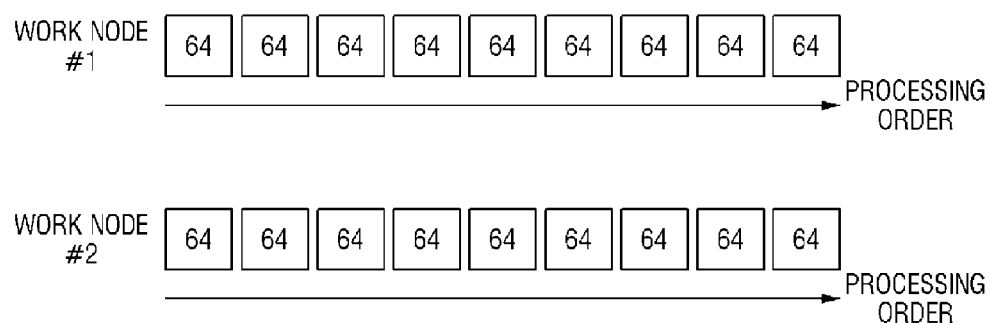
FIG. 7 is a conceptual diagram illustrating an allocation result of a data block in the related art, which compared with FIG. 6.

FIG. 7 illustrates that the work node #1 and the work node #2 are allocated with the same number of base blocks when all files are blocked only into the base blocks in the related art. According to the present invention, the file is blocked into a total of 10 blocks, while the file is blocked into a total of 18 blocks in the related art. In the present invention, the respective work nodes perform an initial work with respect to a block having a large size, while since a block having a small size is targeted in a later work, there is no large burden in load re-balancing in case of necessity. Therefore, in the present invention, there is an effect that the effect of the load distribution may be achieved even with a smaller number of blocks. Further, in the present invention, the second area having a size corresponding to a work environment of the distributed processing system is disposed in the rear of the big size file to provide a block layout suitable for performing the load re-balancing work in the distributed processing system.

Hereinafter, referring to FIGS. 8 and 9, a method for partitioning the first area into the blocks having various sizes will be described in more detail.

Figure 8:
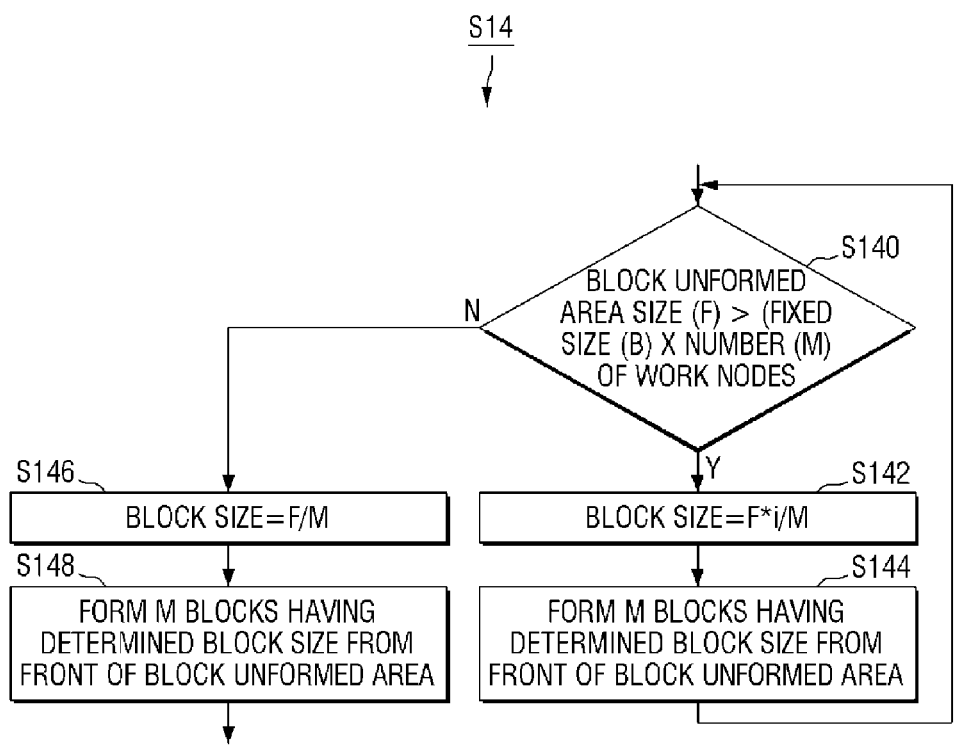
FIG. 8 is a detailed flowchart for describing a partial operation of FIG. 2 in more detail.
Figure 9:
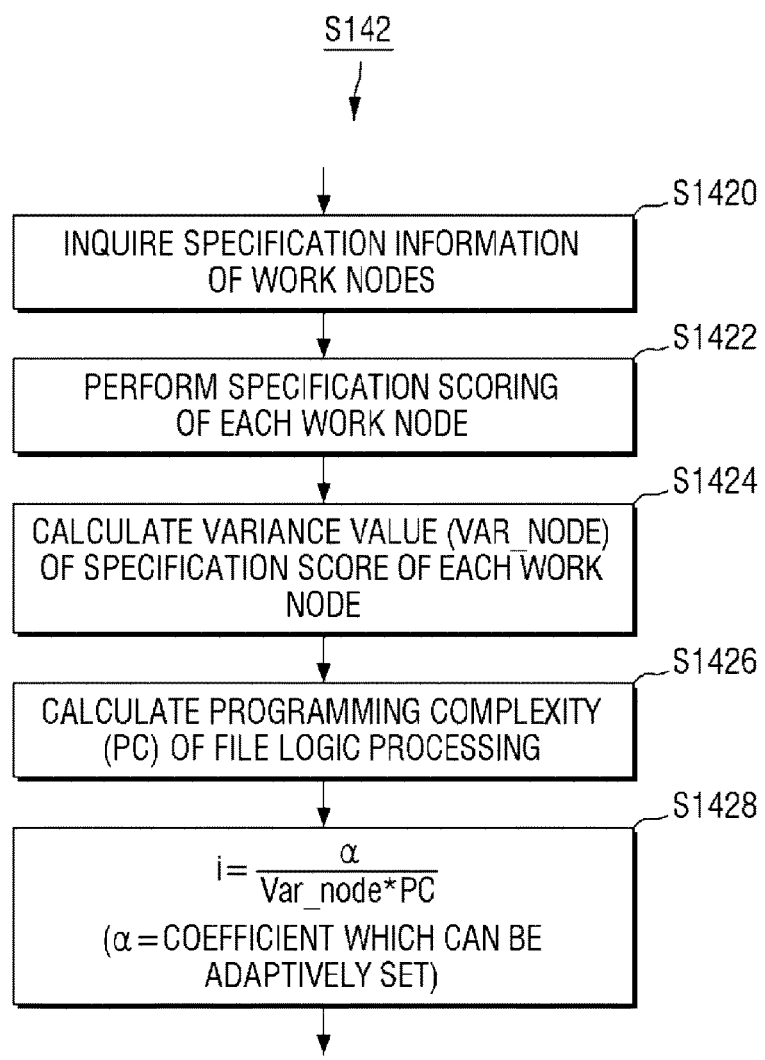
FIG. 9 is a detailed flowchart for describing a partial operation of FIG. 8 in more detail.

FIG. 8 is a detailed flowchart of the first area blocking step (S14) illustrated in FIG. 2.

First, it is determined whether a block unformed area size F of the first area is larger than a value acquired by multiplying a fixed size b of the base block and the number M of work nodes by each other (S140). It may be appreciated that the determining operation is used for determining whether an area to form the block has a size to form a block having a size which exceeds b with respect to each work node. For example, in the case of b=64 MB and M=10, when the block unformed area of the first area is less than 640 MB (it is assumed that the block unformed area of the first area), a size (50 MB) acquired by dividing the size F of the block unformed area by 10 is determined as the block size (S146). Next, forming the block for the first area is completed by forming 10 blocks having 50 MB from the front of the block unformed area (S148).

When the size F of the block unformed area of the first area is larger than the value acquired by multiplying the fixed size b of the base block and the number M of work nodes by each other (S140), the size of a block to be formed is determined as F*i/M (S142). i is a variable partitioning parameter having a value between 0 and 1. In addition, when i is determined once, the value is not changed but constantly maintained. When the block size is determined, M block having the size are sequentially formed from the front of the block unformed area (S144).

For example, if the variable partitioning parameter is 0.6, when an area of 60% in the block unformed area of the first area is divided by the number of work nodes, the size of the block to be formed is determined. The size of a block to be formed next is determined by dividing the remaining area of 60% of the block unformed area by the number of work nodes. Therefore, the size of the formed block decreases as time elapsed. When the size of the formed block is smaller than the fixed size of the base block, a block having the same size is last formed by dividing the remaining area by the number of work nodes and thereafter, blocking the first area is completed.

Further, the block is formed from the front (that is, a part in which the offset of the file is small) of the block unformed area.

Therefore, blocking the first area means sequentially forming blocks (n is a natural number of 2 or more) having first to n sizes from the front of the file. The front and the rear of the file are concepts indicating a processing order of each data included in the file. That is, a case in which a first offset area of the file is ahead of a second offset area means that a case in which the first offset area is processed earlier than the second offset area.

For example, blocking the first area includes a step (M is the number of work nodes) of forming M blocks having a first size from a foremost side of the file and a step of forming M blocks having a second size smaller than the first size in an area where the block is not formed. Of course, when the size of the file is sufficiently large, a step of forming M blocks having a third size smaller than the second size in the area where the block is not yet formed, a step of forming M blocks having a fourth size smaller than the third size in the area where the block is not yet formed, and the like may be additionally performed.

In order to achieve a block number reducing effect of the present invention, it is preferable that the first size is at least larger than the fixed size (shown as 64 MB) of the base block. Therefore, a value of the variable partitioning parameter i is set to a real number value between 0 and 1 and it is preferable to restrict a minimum value of the variable partitioning parameter i so that the first size (that is, the size of a block which is initially formed in the first area) has a larger than the fixed size of the base block. For example, when the size of the first area is 6400 MB, M=10, and the fixed size of the base block is 64 MB, since 6400*0.1/10=64 MB, the variable partitioning parameter value needs to be at least a value of 0.1 or more. That is, a minimum value of the variable partitioning parameter i may be automatically calculated by using the size of the first area, the number of work nodes, and the fixed size of the block.

As the variable partitioning parameter value is closer to 1, the number of blocks formed in the first area will decrease, while the variable partitioning parameter value is closer to 0, the number of blocks formed in the first area will increase. In order to maximize the block reducing effect, forming the entirety of the first area as one block by setting the variable partitioning parameter value to 1 may also be considered. However, when the entirety of the first area is formed as one block, it is not possible to appropriately cope with a case in which an abnormal situation occurs in a specific work node, and as a result, the working speed extremely decreases. In some embodiments which have been already described, only the blocks of the second area may be a target of the load re-balancing, but another some embodiments of the present invention, blocks having a size smaller than a predetermined size among the blocks of the first area as well as the blocks of the second area may be included as the target of the load re-balancing. When the embodiment is considered, blocks having one small size need to be formed even in the first area by considering a situation in which the load re-balancing needs to be performed. Therefore, the variable partitioning parameter value is preferably set to a value less than 1.

The variable partitioning parameter value i may be manually set by the manager, but an optimized value may be automatically set by the system. Hereinafter, an embodiment in which the variable partitioning parameter value i is automatically set will be described in detail with reference to FIG. 9.

By using performance uniformity of each work node, the variable partitioning parameter value may be automatically set. Since the same processing speed for each block may be anticipated as the respective work nodes that distributively process the file have the same performance, the number of blocks to be formed in the first area may decrease. Therefore, as the performance of each work node is uniform, the variable partitioning parameter value may be automatically set a higher value.

The performance uniformity of each work node may be measured from hardware specification information. In the case of an ideal environment in which a lot of other processes other than the process for processing the block are not executed in each work node, the hardware specification information is information which is reliable for predicting the processing speed of the block.

A method for measuring the performance uniformity of each work node from the hardware specification information will be described with reference to FIG. 9. First, the specification information is inquired from resource management information of the distributed processing system (S1420). Next, a specification of each work node is scored (S1422). A plurality of criteria may be applied during the scoring process. For example, when logic to be applied to the file is logic requiring a lot of calculations, a criterion in which a high weighted value is granted to CPU performance is applied to the scoring process, when the logic to be applied to the file is logic requiring a lot of memories, a criterion in which the high weighted value is granted to a memory capacity is applied to the scoring process, and when the logic to be applied to the file is logic requiring a lot of I/Os (an input/output work for a storage), a criterion in which the high weighted value is granted to a storage capacity and a storage speed may be applied to the scoring process. Next, a variance value Var_node (alternatively, a standard deviation value) is calculated with respect to a specification score of each work node calculated as a result of the scoring (S1422) to measure the performance uniformity (S1424). The performance uniformity has a higher value as the variance value (alternatively, standard deviation value) is smaller.

In a situation in which various other processes other than the process for processing the block are executed in each work node, the hardware specification information may not accurately reflect the working environment of each work node. In this case, the processing speed of the block may be predicted by using a benchmarking test result for an actual calculation speed. In this case, an execution result of the calculation speed test which is periodically or aperiodically performed in each work node is automatically collected and thereafter, a variance value (alternatively, standard deviation value) of a score given according to the test execution result is calculated to measure the performance uniformity.

The variable portioning parameter value may be automatically set by using the programming complexity of the logic applied to the file which is distributively processed through each work node. As already mentioned, the logics applied to the respective blocks are the same as each other, but since input data are different from each other, as the programming complexity of the logic is higher, a possibility that calculation loads consumed for processing will be different from each other is higher. Therefore, as the programming complexity of the logic is higher, it is preferable to further increase a load re-balancing capability as compared with variation in block processing speed of each work node by decreasing the work distribution effect parameter. The programming complexity may indicate Cyclomatic Complexity of McCabe.

In an embodiment, when the programming complexity is already reflected in the form of the work distribution effect parameter at the time of acquiring the size of the second area, the programming complexity may not be duplicatively applied to the automatic setting of the variable portioning parameter value used for blocking the first area.

On the contrary, in another embodiment, when the programming complexity is already reflected in the form of the work distribution effect parameter at the time of acquiring the size of the second area, the programming complexity may not be duplicatively applied to the automatic setting of the variable portioning parameter value used for blocking the first area.

In yet another embodiment, in the case where the programming complexity has a value which is equal to or less than a predetermined limit value, when the programming complexity is already reflected in the form of the work distribution effect parameter at the time of acquiring the size of the second area, the programming complexity is not duplicatively applied to the automatic setting of the variable portioning parameter value used for blocking the first area and in the case where the programming complexity has the value which is equal to or more than the limit value, even though the programming complexity is already reflected in the form of the work distribution effect parameter at the time of acquiring the size of the second area, the programming complexity may be duplicatively applied to the automatic setting of the variable portioning parameter value used for blocking the first area.

Both the programming complexity and the performance uniformity may be, of course, reflected to setting the variable portioning parameter value i (S1428). In this case, the variable portioning parameter value i may be in inverse proportion to the variance value Var_node of the specification score of each work node and the programming complexity PC. α in an equation illustrated in FIG. 9 is a coefficient which may be adaptively set during a test process.

Management for Distributed Processing (Task Scheduling)

Hereinafter, referring to FIG. 10, a distributed processing management method according to yet another embodiment of the present invention will be described. The distributed processing management method according to the embodiment may be performed by a computing device. For example, the distributed processing management method according to the embodiment may be performed by the distributed processing management apparatus 100 illustrated in FIG. 1. Hereinafter, in a description associated with the embodiment, it is noted that a main agent of an operation may be omitted for helping convenience of appreciation.

First, the file blocking operation illustrated in FIG. 2 is performed (S10, S12, S13, S14, and S15). In this case, the embodiments associated with the file blocking of the present invention described with reference to FIGS. 3 to 9 may be, of course, applied.

The file blocking is completed and thereafter, the respective blocks are evenly allocated to the respective work nodes (S16). "Even allocation" means allocating a block having a specific size not to be concentrated in a specific work node. For example, "even allocation" means allocating the blocks so that when the first work node has M blocks having the first size, other work nodes have M blocks having the first size. Of course, the number of blocks is short to be allocated to all work nodes, some work nodes may not be allocated with blocks allocated to other work nodes. The meaning of "even allocation" is described by referring to the description associated with FIG. 6.

After the block allocation is completed, a block processing situation of each work node is monitored (S17). The monitoring may be performed by a scheme in which each work node verifies a recorded log or each work node transmits a report message at the time of completing block processing. The block processing indicates that each work node applies processing logic of the blocked file to data included in the allocated block.

As a result of the monitoring, when it is determined that the load re-balancing is required, the distributed processing management apparatus 100 performs the load re-balancing for the block of the second area (S18). For example, when one unprocessed block among 8 second areas blocks allocated to a first work node exists in the first work node, but 7 unprocessed blocks among 8 second area blocks allocated to a second work node exist in the second work node, the distributed processing management apparatus 100 may determine that the load re-balancing is required and reallocate at least some of the second area blocks allocated to the second work node to the first work node.

In an embodiment, the distributed processing management apparatus 100 may perform the load re-balancing when a situation is serious, in which an upper-lower deviation of the unprocessed blocks among the second area blocks exceeds a predetermined criterion (for example, when an unprocessed block possession difference of a most significant bit and a least significant bit exceeds 50% of the number of second area blocks allocated to each work node).

The distributed processing management apparatus 100 manages the distributed processing so that each work node processes all blocks allocated substantially at the same time (S19).

Figure 10:
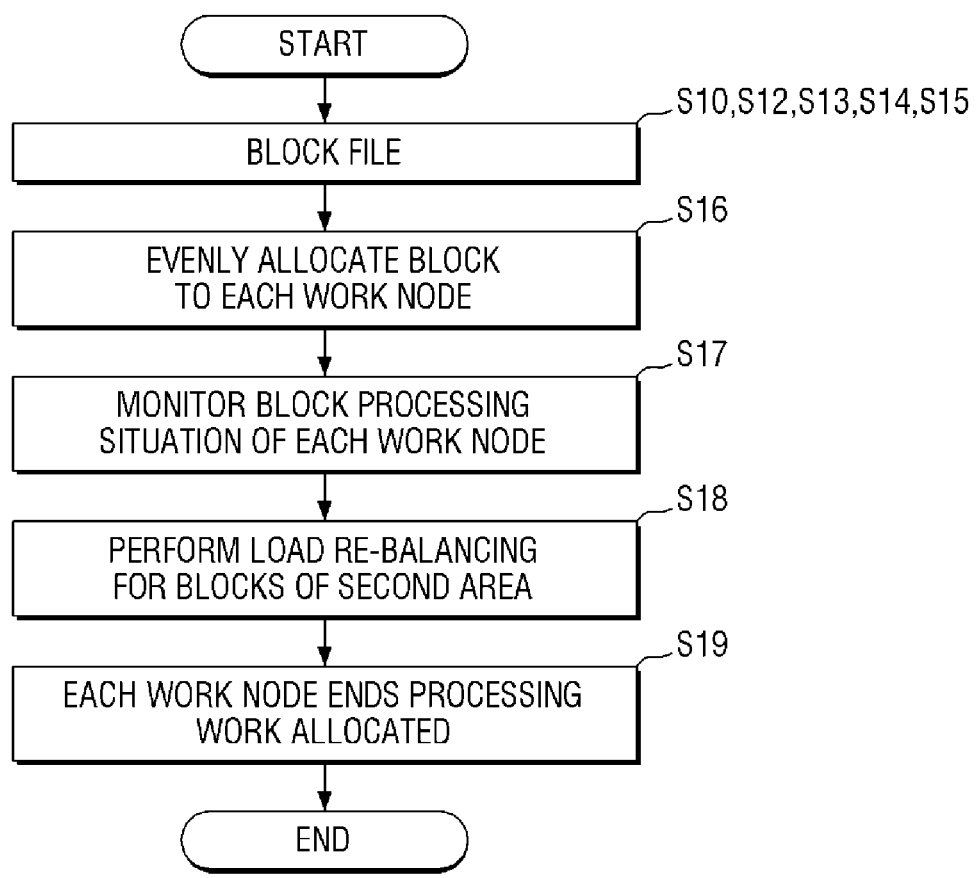
FIG. 10 is a flowchart of a method for big size file blocking according to yet another embodiment of the present invention.

Up to now, in FIG. 10 and the associated description, it is described that only the block of the second area becomes a target of the load re-balancing, but in some embodiments, it is noted that the load re-balancing may be performed even with respect some blocks among the blocks of the first area as well as the blocks of the second area. The block in which the load rebalancing is performed among the blocks of the first area is a block having a size smaller than a predetermined size.

The methods according to the embodiment of the present invention described with reference to FIGS. 1 to 10 up to now may be performed by executing a computer program implemented with a computer readable code. The computer program is transmitted from a first computing device to a second computing device through a network such as the Internet, or the like to be installed in the second computing device, and as a result, the computer program may be used in the second computing device. The first computing device and the second computing device include all fixed computing devices such as a service device, a physical server that belongs to a serve pool for a cloud service, and a desktop PC.

The computer program may be stored in recording media such as a DVD-ROM, a flash memory device, and the like.

Hereinafter, referring to FIG. 11, a configuration and an operation of a distributed processing management apparatus of a big size file according to yet another embodiment of the present invention will be described.

Figure 11:
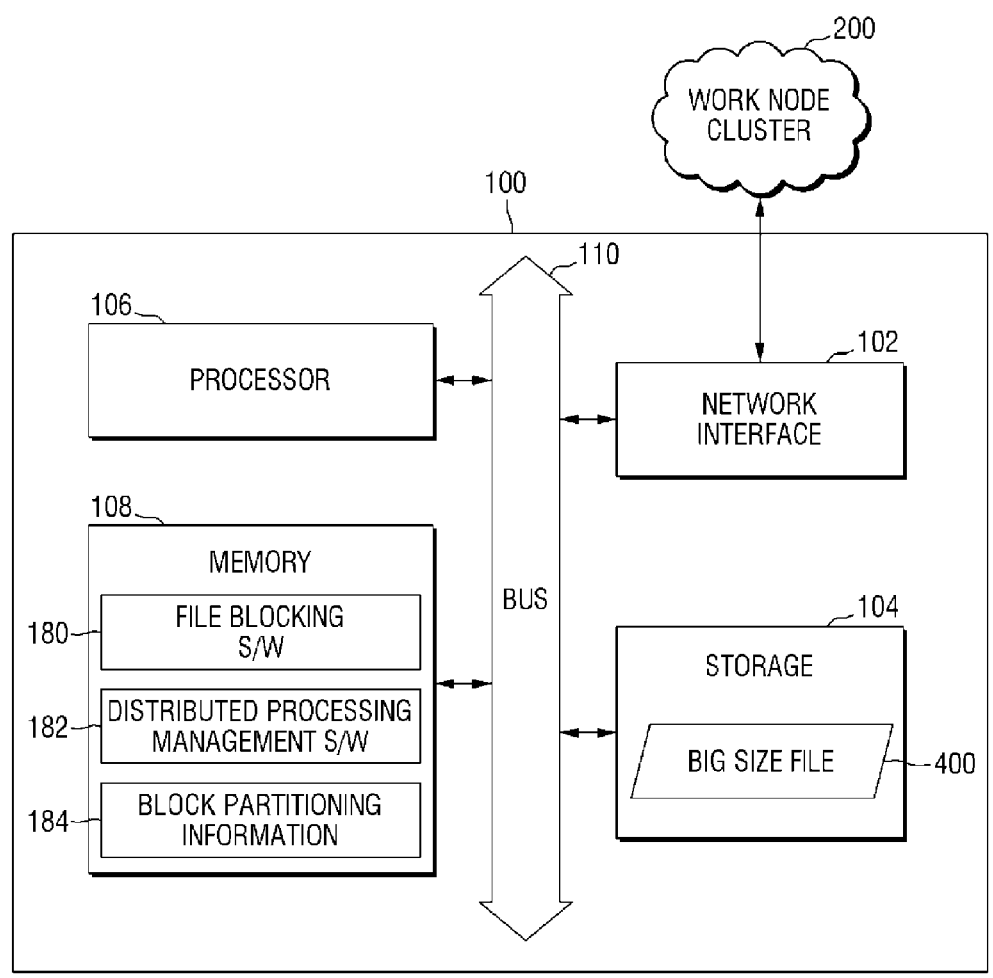
FIG. 11 is a layout view of a distributed processing apparatus of a big size file according to yet another embodiment of the present invention.

As illustrated in FIG. 11, the distributed processing management apparatus 100 of the big size file according to the embodiment may include one or more processors 106, a network interface 102 connected to a plurality of work nodes that belong to a distributed processing system, a storage 104, and a memory (RAM) 108 to which the computer program performed by a processor 106 is loaded. The processor 106, the network interface 102, the storage 104, and the memory 108 transmit and receive data through a system bus 110.

The storage 104 may temporarily store a big size file 400 received from a big size data generating system through the network interface 102.

The computer program includes file blocking software 180.

The file blocking software 180 includes an operation of dividing a first area and a second area processed later than data of the first area, an operation of partitioning the first area into blocks having various sizes, and an operation of partitioning the second area into blocks having a fixed size. The file blocking method has already been described in detail with reference to FIGS. 1 to 9. The file blocking software 180 records a blocking result of the big size file 400 on the memory 108 as block partitioning information 184. The block partitioning information 184 may include an offset range of each block.

Distributed processing management software 182 includes operations of taking charge of task scheduling. The distributed processing management software 182 may include an operation of evenly dividing and transmitting the blocks of the first area and the blocks of the second area to the plurality of work nodes through the network interface 102 and an operation of performing a load re-balancing work for the blocks of the second area according to a unprocessed block situation of the respective work nodes by monitoring a block processing situation of the work nodes.

The distributed processing management apparatus 100 of the big size file according to the embodiment blocks in a first half part of the big size file of which the load re-balancing is not required into blocks having a large size and blocks in a second half part of the big size file of which the load re-balancing my be required into blocks a small fixed size, respectively. Therefore, the distributed processing management apparatus 100 may bring the same effect of the work distribution with a smaller number of blocks than the fixed-size blocking in the related art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for big size file blocking for distributed processing by a plurality of work nodes that belong to a distributed processing system, the method comprising:
    dividing a file into a first area and a second area, data of the second area being processed after processing data of the first area;
    partitioning the first area into blocks having a plurality of sizes; and
    partitioning the second area into blocks having a fixed size,
    wherein the first area comprises M blocks for each of the plurality of sizes respectively, M being a number of the plurality of work nodes,
    wherein the partitioning of the first area into the blocks having the plurality of sizes comprises:
        forming M blocks having a first size, from a foremost side of the file; and
        forming M blocks having a second size, smaller than the first size, in an area where no block is formed, and
    wherein the file is processed from a front to a rear of the file.

2. The method of claim 1,
    wherein the first size is larger than the fixed size.

3. The method of claim 1,
    wherein the partitioning of the first area into the blocks having the plurality of sizes further comprises:
    repeating forming M blocks having the first size that is smaller than the second size of a block which is formed immediately before in the area where no block is formed, under a condition in which the first size is larger than the fixed size.

4. The method of claim 1,
    wherein the second size indicates a size of (F*i/M)
    F=the size of the area where no block is formed, and
    i=variable partitioning parameter, (0<i<1).

5. The method of claim 4,
    wherein i is set to a higher value in response to respective performances of the plurality of work nodes being the same as each other.

6. The method of claim 4,
    wherein i is set to a lower value in response to a complexity of logic that processes the file being higher, and the complexity is determined by a programming complexity.

7. The method of claim 1,
    wherein a size of the second area is determined by using the number of the plurality of work nodes.

8. The method of claim 7,
    wherein the size of the second area is further determined by using a number of parallel processes for data distributed processing respectively executed by the plurality of work nodes.

9. The method of claim 8,
    wherein the size of the second area is a value acquired by multiplying the fixed size, the number of the plurality of work nodes, the number of parallel processes for the data distributed processing, and a work distribution effect parameter, by each other, and
    the work distribution effect parameter is a natural number of 1 or more, which is set to a larger value in response to a need for the plurality of work nodes to simultaneously complete the file processing increases.

10. The method of claim 1,
    wherein a size of the second area is determined by reflecting a work distribution effect parameter being set to a smaller value in response to respective performances of the plurality of work nodes being the same as each other.

11. The method of claim 1,
    wherein a size of the second area is determined by reflecting a work distribution effect parameter being set to a smaller value in response to an operation cost of each of the plurality of word nodes being smaller.

12. The method of claim 1,
    wherein a size of the second area is determined by reflecting a work distribution effect parameter being set to a larger value in response to a programming complexity of processing logic of the file being higher, and
    the programming complexity indicates a Cyclomatic Complexity value of McCabe.

13. The method of claim 1,
    wherein the blocks of the first area are blocks that need to be processed by an initially allocated work node and the blocks of the second area are blocks that the initially allocated work node transfers to another work node.

14. A distributed processing method of a big size file, comprising:
    providing a file having a first area partitioned into blocks comprising a plurality of sizes and a second area, data of the second area being processed after processing data of the first area, partitioned into blocks having a fixed size;

evenly dividing and allocating the blocks of the first area and the blocks of the second area to a plurality of work nodes that belong to a distributed processing system; and performing a load re-balancing work according to an unprocessed block situation of each work node by monitoring processing situations for the blocks being processed by the plurality of work nodes, wherein the performing of the load re-balancing work comprises performing the load re-balancing only for blocks having a size which is equal to or smaller than a predetermined size among the blocks of the second area and the blocks of the first area.

15. The method of claim 14,
wherein sizes of at least some blocks among the blocks of the first area are larger than the fixed size.

16. The method of claim 14,
wherein the performing of the load re-balancing work comprises performing the load re-balancing only for the blocks of the second area.

17. A distributed processing management apparatus of a big size file, comprising:
at least one processor;
a memory to which a computer program that is to be executed by the at least one processor is loaded; and
a network interface configured to connect a plurality of work nodes that belong to a distributed processing system, wherein the computer program causing the at least one processor to execute a process comprising:
dividing a file distributively processed by the plurality of work nodes into a first area and a second area, data of the second area being processed after processing data of the first area;
partitioning of the first area into blocks having a plurality of sizes;
partitioning the second area into blocks having a fixed size; and
evenly dividing and transmitting the blocks of the first area and the blocks of the second area to the plurality of work nodes through the network interface, wherein the first area comprises M blocks for each of the plurality of sizes respectively, M being a number of the plurality of work nodes, wherein the partitioning of the first area into the blocks having the plurality of sizes comprises:
forming M blocks having a first size, from a foremost side of the file; and
forming M blocks having a second size, smaller than the first size, in an area where no block is formed, wherein the file is processed from a front to a rear of the file.

* * * * *